United States Patent
Ryne et al.

(10) Patent No.: US 10,641,316 B2
(45) Date of Patent: May 5, 2020

(54) BEARING SLEEVE FOR A SHAFT

(71) Applicant: STEERING SOLUTIONS IP HOLDING CORPORATION, Saginaw, MI (US)

(72) Inventors: Patrik M. Ryne, Midland, MI (US); Troy A. Daenzer, Reese, MI (US); Bruce D. Kniebbe, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 301 days.

(21) Appl. No.: 15/710,121

(22) Filed: Sep. 20, 2017

(65) Prior Publication Data

US 2018/0010629 A1 Jan. 11, 2018

Related U.S. Application Data

(62) Division of application No. 14/547,558, filed on Nov. 19, 2019, now Pat. No. 9,803,684.

(51) Int. Cl.
*F16C 3/035* (2006.01)
*F16C 29/04* (2006.01)
(Continued)

(52) U.S. Cl.
CPC ............ *F16C 3/035* (2013.01); *B23P 15/003* (2013.01); *F16C 29/04* (2013.01); *F16C 29/046* (2013.01);
(Continued)

(58) Field of Classification Search
CPC ...... F16C 3/035; F16C 33/40; F16C 33/3812; F16C 29/04; F16C 33/60; F16C 29/046;
(Continued)

(56) References Cited

U.S. PATENT DOCUMENTS 1,966,775 A 7/1934 Weis
2,706,137 A * 4/1955 Stricklen ................. F16C 33/40
(Continued)

FOREIGN PATENT DOCUMENTS

DE 19824477 A1 12/1999
DE 202008015070 U1 5/2010
EP 1930610 A1 6/2008

OTHER PUBLICATIONS

European Search Report for EP Application No. 15193755.4 dated May 3, 2016.

*Primary Examiner* — Greg Binda
(74) *Attorney, Agent, or Firm* — Dickinson Wright PLLC

(57) ABSTRACT

A rolling element shaft assembly includes a solid shaft having a first end and a second end, a tubular shaft configured to receive the shaft first end, and a bearing sleeve coupled to the solid shaft. The bearing sleeve includes a first portion defining a first edge, a second edge, and at least one first bearing aperture, and a second portion defining a third edge, a fourth edge, and at least one second bearing aperture. The first portion is configured to couple to the second portion about the solid shaft. The bearing sleeve further includes at least one first bearing disposed within the at least one first bearing aperture and at least one second bearing disposed within the at least one second bearing aperture.

6 Claims, 5 Drawing Sheets

(51) Int. Cl.
  *F16C 33/60* (2006.01)
  *B23P 15/00* (2006.01)
  *F16D 3/06* (2006.01)
  *F16C 33/38* (2006.01)
  *F16C 33/40* (2006.01)

(52) U.S. Cl.
  CPC .......... *F16C 33/3812* (2013.01); *F16C 33/40* (2013.01); *F16C 33/60* (2013.01); *F16D 3/065* (2013.01); *F16C 2326/24* (2013.01)

(58) Field of Classification Search
  CPC .... F16C 2326/24; F16D 3/065; B23P 15/003; B62D 1/20
  USPC .................................................. 464/167, 168
  See application file for complete search history.

(56) References Cited

U.S. PATENT DOCUMENTS

| | | |
|---|---|---|
| 3,110,529 A | 11/1963 | Schaeffler |
| 3,399,008 A | 8/1968 | Farrell et al. |
| 3,729,239 A | 4/1973 | Camosso |
| 4,397,507 A | 8/1983 | Kraus et al. |
| 4,708,498 A | 11/1987 | Labedan et al. |
| 5,345,679 A | 9/1994 | Lennon et al. |
| 6,174,086 B1 | 1/2001 | Ng et al. |
| 6,505,969 B2 | 1/2003 | Senger |
| 6,623,036 B2 | 9/2003 | Yamamura et al. |
| 6,705,948 B2 | 3/2004 | Cermak et al. |
| 7,104,692 B1 | 9/2006 | Lu |
| 7,258,492 B2 | 8/2007 | Yoon |
| 2012/0195539 A1 | 8/2012 | Friedrich et al. |
| 2016/0138644 A1 | 5/2016 | Ryne et al. |

\* cited by examiner

BEARING SLEEVE FOR A SHAFT

CROSS-REFERENCES TO RELATED APPLICATIONS

This patent application is a divisional of U.S. patent application Ser. No. 14/547,558, filed Nov. 19, 2014, now U.S. Pat. No. 9,803,684, which is incorporated herein by reference in its entirety.

FIELD OF THE INVENTION

The present disclosure generally relates to shaft assemblies and, more specifically, to intermediate shaft assemblies for vehicles.

BACKGROUND OF THE INVENTION

Intermediate shafts (I-shafts) are designed to be a component of torque transfer from a steering column to a steering gear. They may also allow axial movement while maintaining this ability to transfer torque. I-shafts that utilize ball bearings that roll between a metal solid shaft and a metal tubular shaft are commonly referred to as rolling element I-shafts.

Some known rolling element I-shafts include one piece ball bearing retention sleeve which slides onto the shaft axially into ball grooves. To allow for this process, secondary machining on the male shaft and separate components are required to create a mechanical retention feature for the retention sleeve. In addition, ball grooves must extend to the end of the shaft to facilitate assembly of the retention sleeve to the shaft. These design additions add cost and complexity. Accordingly, it is desirable to provide an I-shaft without the need for extra processing and retention features on the male shaft.

SUMMARY OF THE INVENTION

In one aspect, a bearing sleeve for a rolling element shaft assembly having a solid shaft is provided. The bearing sleeve includes a first portion defining a first edge, a second edge, and a first plurality of ball bearing apertures, and a second portion defining a third edge, a fourth edge, and a second plurality of ball bearing apertures. The first portion is configured to couple to the second portion about the solid shaft.

In another aspect, a rolling element shaft assembly is provided. The rolling element shaft assembly includes a solid shaft having a first end and a second end, a tubular shaft configured to receive the shaft first end, and a bearing sleeve coupled to the solid shaft. The bearing sleeve includes a first portion defining a first edge, a second edge, and at least one first bearing aperture, and a second portion defining a third edge, a fourth edge, and at least one second bearing aperture. The first portion is configured to couple to the second portion about the solid shaft. The bearing sleeve further includes at least one first bearing disposed within the at least one first bearing aperture and at least one second bearing disposed within the at least one second bearing aperture.

In yet another aspect, a method of assembling a rolling element shaft assembly is provided. The method includes providing a solid shaft having a first end and a second end, providing a tubular shaft, and providing a bearing sleeve having a first portion and a second portion, the first portion defining a first edge, a second edge, and at least one first bearing aperture, the second portion defining a third edge, a fourth edge, and at least one second bearing aperture. The method further includes providing at least one first ball bearing disposed within the at least one first bearing aperture, providing at least one second ball bearing disposed within the at least one second bearing aperture, coupling the bearing sleeve first and second portions radially about the solid shaft, and inserting the solid shaft into the tubular shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Described herein are systems and method for an intermediate shaft assembly. A two-piece bearing sleeve may be assembled onto a solid shaft without having to be inserted on an end of the solid shaft. As such, the bearing sleeve may be assembled radially onto the solid shaft as opposed to axially. This eliminates the need to process or machine retention features on the solid shaft to retain the bearing sleeve after it has been assembled onto the solid shaft.

Figure 1:
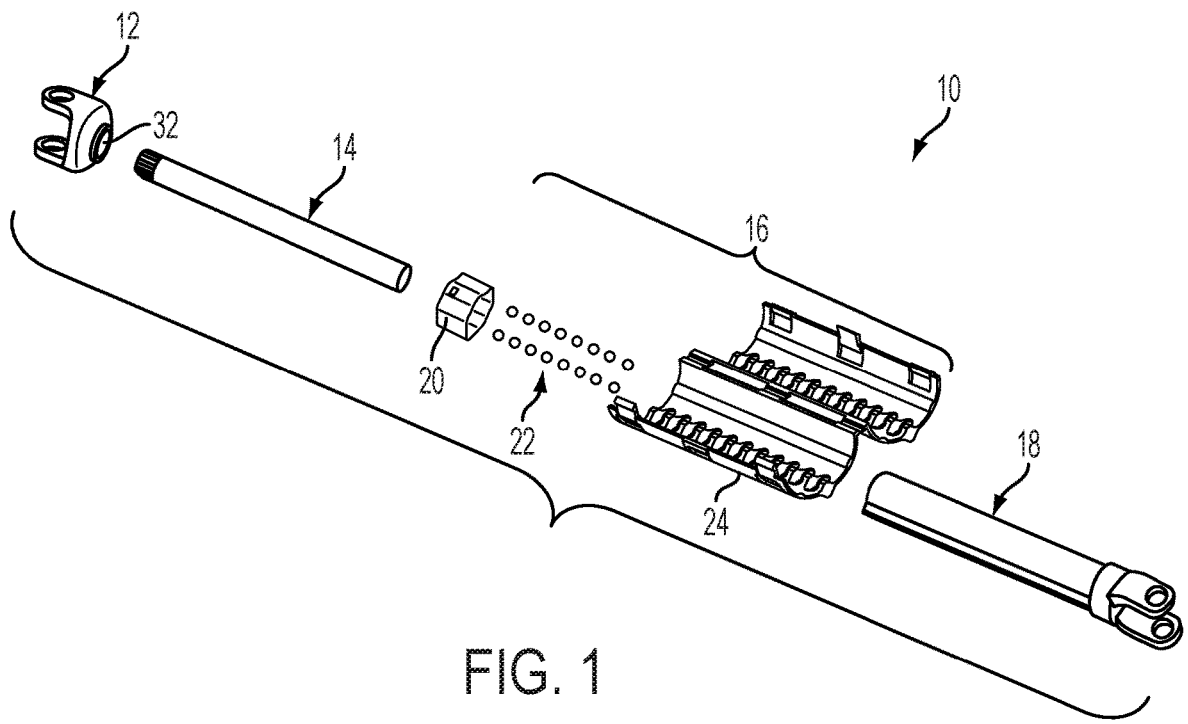
FIG. 1 is an exploded view of an exemplary shaft assembly of the invention.

Referring now to the Figures, where the invention will be described with reference to specific embodiments, without limiting same, FIG. 1 illustrates an exemplary rolling element intermediate shaft (I-shaft) assembly 10 that generally includes a yoke 12, a solid shaft 14, a roller assembly 16, and a tubular shaft 18. Roller assembly 16 includes a cap 20, ball bearings 22, and a sleeve 24. In the exemplary embodiment, I-shaft assembly 10 is configured for use in a vehicle steering column assembly (not shown). However, shaft assembly 10 described herein may be used in any other suitable system.

Figure 2:
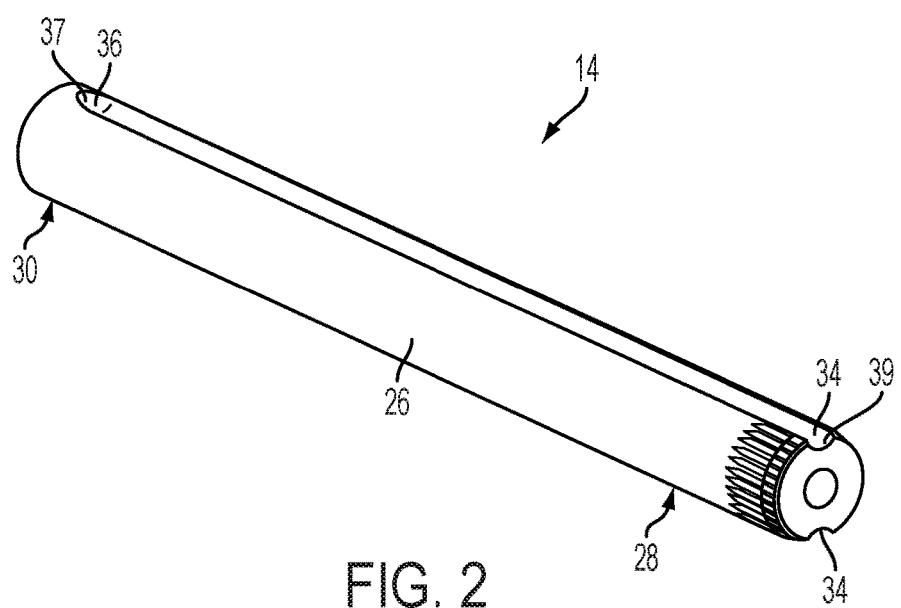
FIG. 2 is a perspective view of an exemplary solid shaft of the assembly shown in FIG. 1.

FIG. 2 illustrates solid shaft 14, which generally includes a solid body 26 having a first end 28 and a second end 30. First end 28 is configured for insertion into an aperture 32 of yoke 12 (see FIG. 1) to facilitate coupling therebetween, and second end 30 is configured for insertion into tubular shaft 18. Solid body 26 includes grooves 34, which extend axially along the length of solid shaft 14 and include an end stop 36 having an abutting surface 37 acting as a termination or truncation of grooves 34 preventing an extension of grooves 34 to second end 30. Groove 34 has an open end 39 at first end 28. Although two grooves 34 are illustrated, solid shaft 14 may have any number of grooves that enable assembly 10 to function as described herein. For example, solid shaft 14 may have three or four grooves 34.

Figure 3:
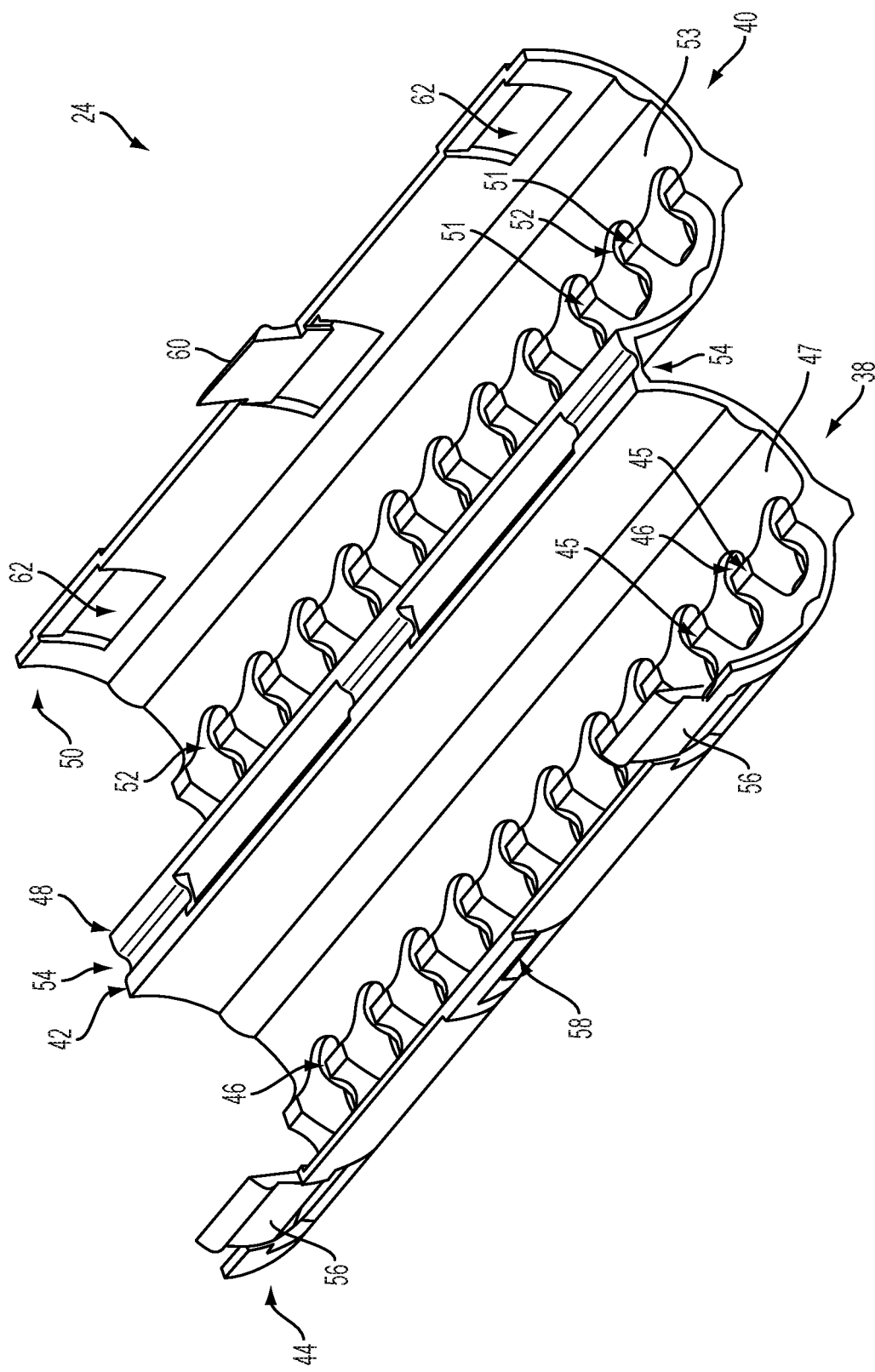
FIG. 3 is a perspective view of an exemplary bearing sleeve of the assembly shown in FIG. 1.

FIG. 3 illustrates sleeve 24, which generally includes a first portion 38 and a second portion 40. First portion 38 includes a first edge 42, a second edge 44, a first plurality of protrusions 45, and a plurality of bearing apertures 46. The first plurality of protrusions 45 extend away from an inner surface 47 of the first portion 38 such that a bearing aperture of the plurality of bearing apertures 46 is disposed between protrusions of the first plurality of protrusions 45. The second portion 40 includes a first edge 48, a second edge 50, a second plurality of protrusions 51, and a plurality of bearing apertures 52. The second plurality of protrusions 51 extends away from an inner surface 53 of the second portion 40 such that a bearing aperture of the plurality of bearing apertures 52 is disposed between protrusions of the second plurality of protrusions 51. In the exemplary embodiment, first and second portions 38, 40 are semi-cylindrical or substantially semi-cylindrical, and further are semi-circular in cross-section or substantially semi-circular in cross-section. However, first and second portions 38, 40 may have any suitable shape that enables sleeve 24 to function as described herein.

In the exemplary embodiment, first and second portions 38, 40 are coupled along first edges 42, 48 with one or more connectors or hinges 54 such that sleeve 24 has a clamshell configuration. In the embodiment shown, hinge 54 is a living hinge having the same physical properties of sleeve 24. However, first and second portions 38, 40 may be coupled by any means that enables sleeve 24 to function as described herein. For example, first edges 42, 48 may be coupled by a pin operably associated with a pin aperture (not shown). Second edge 44 of first portion 38 includes one or more clip members 56 and one or more clip apertures 58, and second edge 50 of second portion 40 includes one or more clip members 60 and one or more clip apertures 62. Clip apertures 58 are configured to receive clip members 60, and clip apertures 62 are configured to receive clip members 56 such that second edges 44, 50 may be coupled. Accordingly, sleeve 24 is cylindrical or substantially cylindrical when first edges 42, 48 and second edges 44, 50 are coupled.

Figure 4:
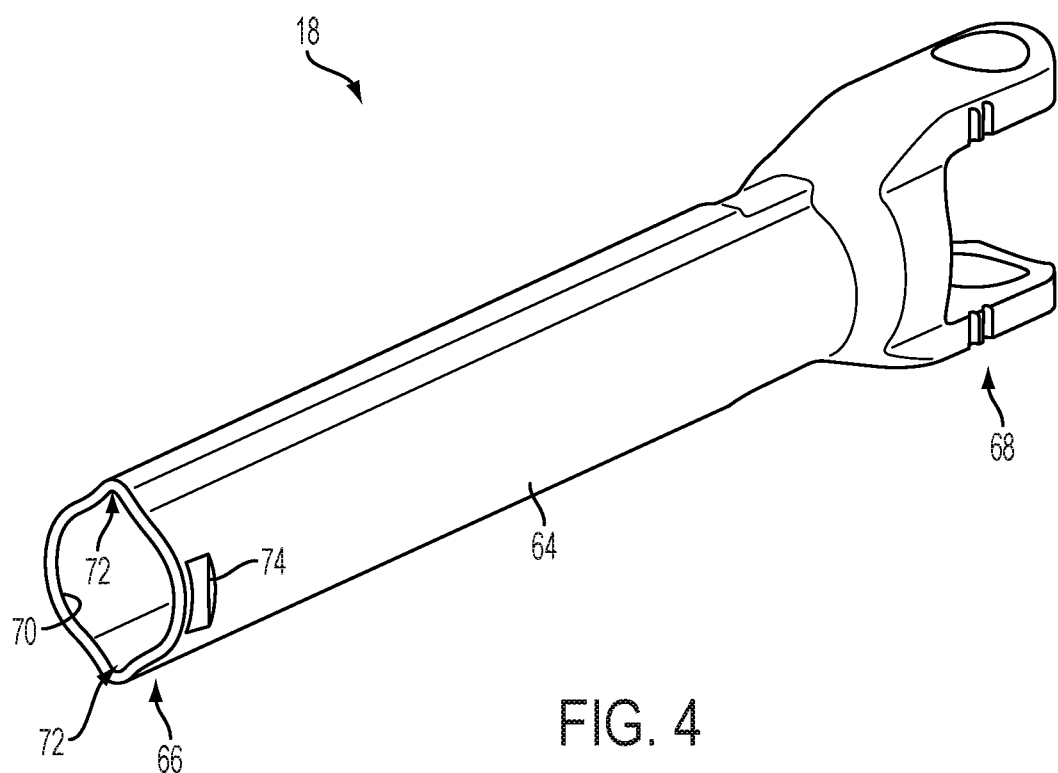
FIG. 4 is a perspective view of an exemplary tubular shaft of the assembly shown in FIG. 1.
Figure 5:
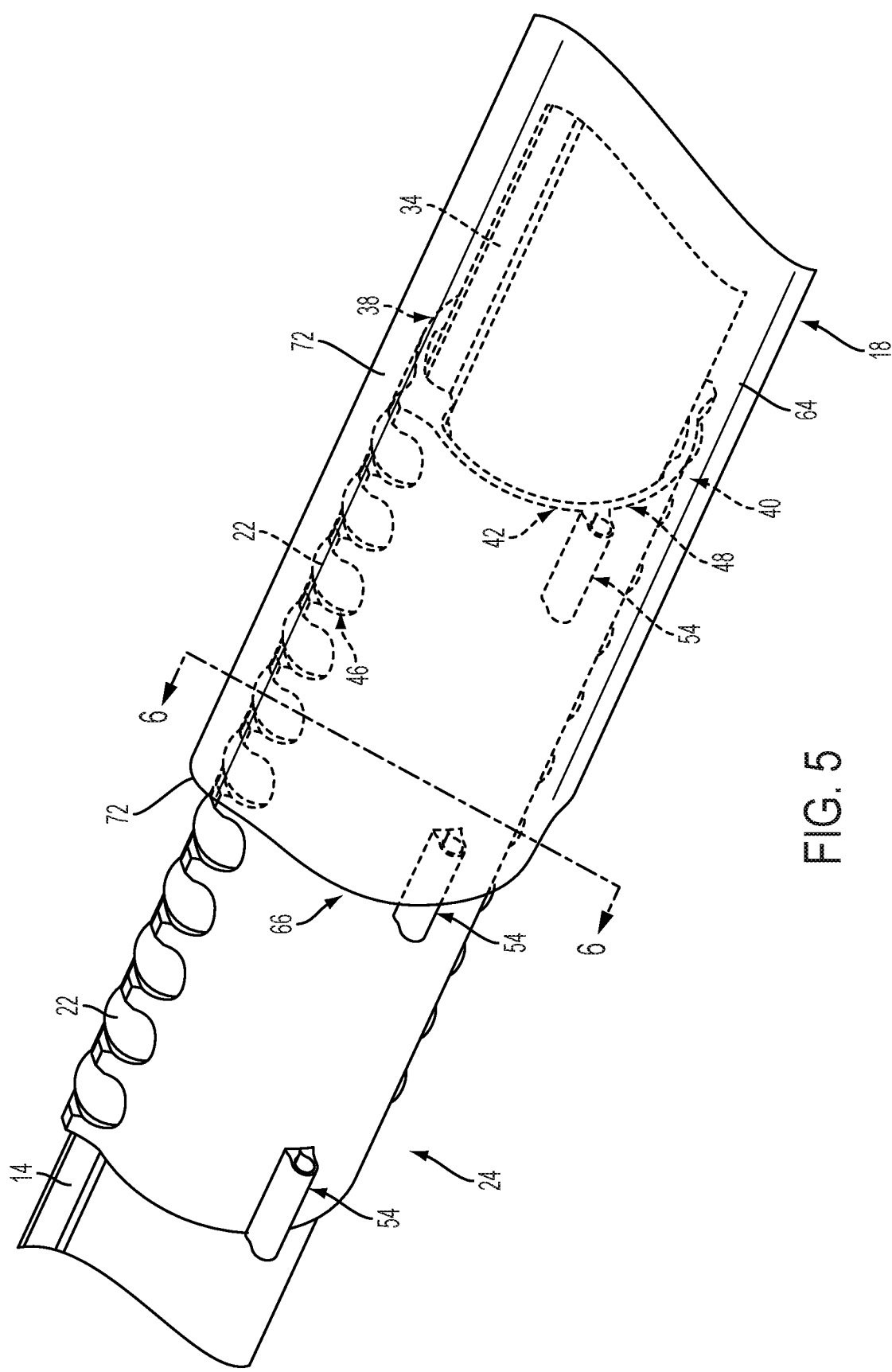
FIG. 5 is a perspective view of a portion of the assembly shown in FIG. 1 after assembly.
Figure 6:
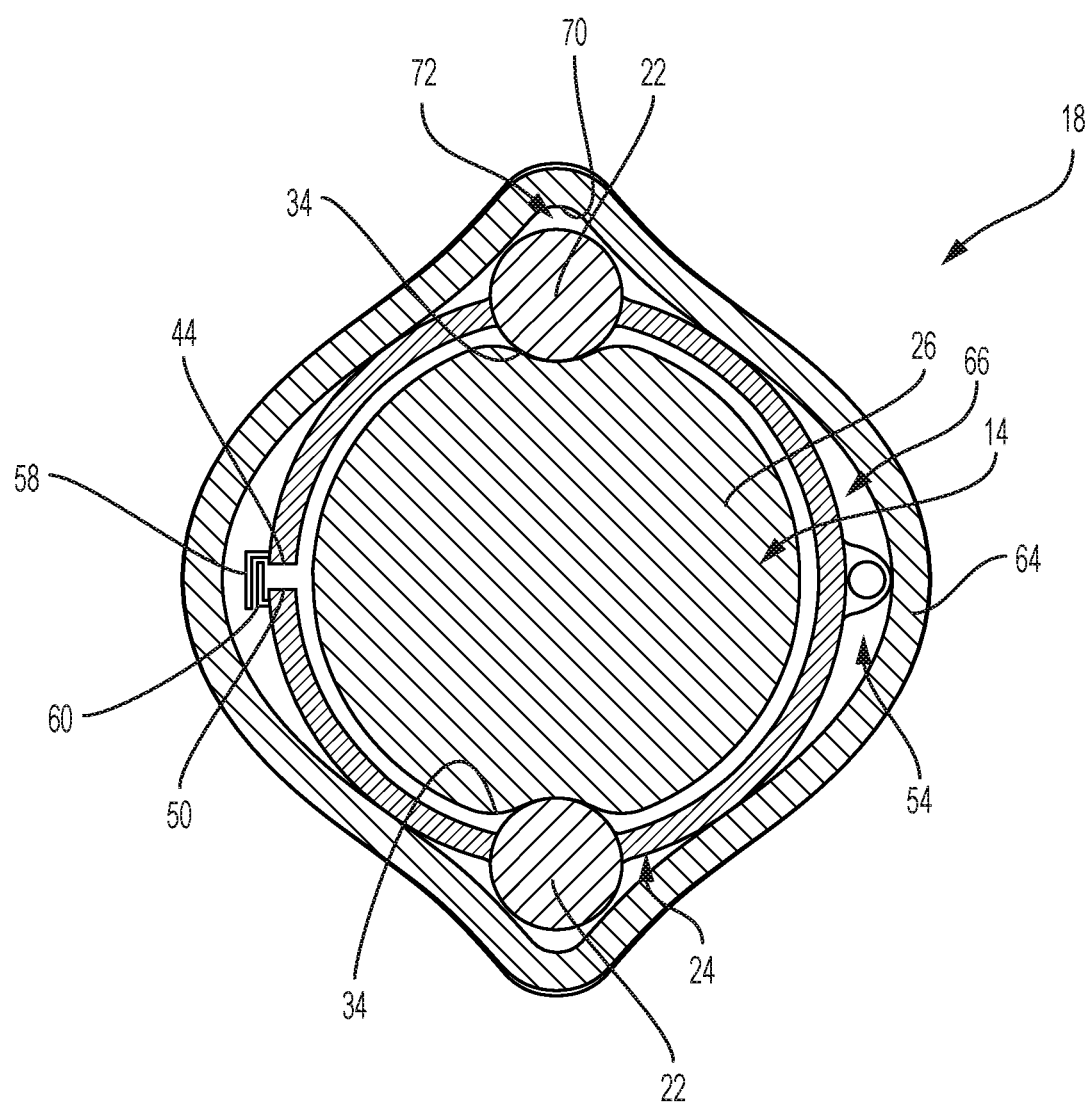
FIG. 6 is a cross-sectional view of the portion of the assembly of FIG. 5.

FIG. 4 illustrates tubular shaft 18, which generally includes a tubular body 64 having an open end 66 and a yoke end 68. Open end 66 is configured to receive roller assembly 16 and solid shaft second end 30, as shown in FIG. 5 and FIG. 6, and yoke end 68 is configured to couple to the steering column assembly (not shown). Tubular body 64 includes an inner wall 70 having axially extending grooves 72 formed therein. Grooves 72 are configured to receive ball bearings 22 at least partially therein. Tubular body 64 also includes one or more slots 74 configured to retain cap 20 on tubular shaft open end 66. However, cap 20 may be coupled to tubular shaft 18 in any suitable manner.

With reference to FIGS. 1-5, assembly of I-shaft assembly 10 includes providing yoke 12, solid shaft 14, roller assembly 16, and tubular shaft 18. With sleeve 24 in the open position (FIG. 3), ball bearings 22 are inserted into and retained within bearing apertures 46, 52 and retained between the first and second plurality of protrusions 45, 51. Sleeve first portion 38 is positioned against solid shaft 14 such that ball bearings 22 are aligned along groove 34. Sleeve second portion 40 is then rotated about hinges 54 toward first portion 38 until second edges 44, 50 are in contact or in close proximity. At this point, ball bearings of second portion 40 are aligned along groove 34 clip members 56 and 60 are inserted into respective clip apertures 62 and 58 to secure sleeve 24 to solid shaft 14 (see FIG. 5). Ball bearings 22 are able to roll along grooves 34 toward shaft second end 30 until they are stopped by end stop 36. Machining of shaft 14 with end stop 36 is significantly easier than machining shaft 14 with grooves that would run to the end 39 of shaft 14. In addition, end stop 36 facilitates maintaining roller assembly 16 on shaft 14 during final assembly of shaft 14 within tubular shaft 18. Accordingly, sleeve 24 may be assembled onto solid shaft 14 from a radial direction and is not required to be assembled from the axial direction like some known assemblies.

Solid shaft second end 30 is inserted into tubular shaft open end 66 and oriented such that ball bearings 22 are aligned within grooves 72. As illustrated in FIGS. 2 and 4, both grooves 34 as well as both grooves 72 are oriented approximately 180° from each other. However, grooves 34 and grooves 72 may be oriented with respect to each other at any suitable angle that enables assembly 10 to function as described herein. Further, as noted herein, assembly 10 may include any number of sets of grooves 34 and grooves 72. Grooves may be equally disposed about the circumference of shaft 14 as shown.

Cap 20 is inserted over solid shaft 14 and is coupled to tubular shaft open end 66 (see FIGS. 1 and 4), which facilitates securing sleeve 24 between shafts 14, 18 and preventing foreign objects or contaminants from getting into tubular shaft 18 and hindering the operation of roller assembly 16. Yoke 12 may then be coupled to solid shaft first end 28 in any suitable manner (e.g., press-fitting, welding, etc.).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rolling element shaft assembly comprising:
    a solid shaft having a first end and a second end;
    a tubular shaft configured to receive the second end of the solid shaft;
    a bearing sleeve coupled to the solid shaft, the bearing sleeve comprising:
        a first portion defining a first edge, a second edge, a first plurality of protrusions extending from an inner surface of the first portion, and at least one first bearing aperture; and
        a second portion defining a third edge, a fourth edge, and at least one second bearing aperture, the first portion configured to couple to the second portion about the solid shaft;
    at least one first ball bearing disposed within the at least one first bearing aperture and retained between the first plurality of protrusions;
    at least one second ball bearing disposed within the at least one second bearing aperture; and
    the solid shaft further comprising a first axially extending groove and a second axially extending groove, the at least one first bearing and the first plurality of protrusions being disposed in the first axially extending groove, and the at least one second bearing disposed in the second axially extending groove.

2. The assembly of claim 1, wherein the first and second axially extending grooves each includes an end stop distanced from the second end of the solid shaft, the end stop having an abutting surface configured to prevent the at least one first and second bearings respectively disposed in the first and second axially extending grooves from extending to the second end of the solid shaft.

3. The assembly of claim 1, wherein the at least one first bearing aperture comprises a first plurality of bearing apertures, the at least one second bearing aperture comprises a second plurality of bearing apertures, the at least one first bearing comprises a first plurality of bearings, and the at least one second bearing comprises a second plurality of bearings.

4. A rolling element shaft assembly comprising:
a solid shaft having a first end and a second end;
a tubular shaft configured to receive the second end of the solid shaft;
a bearing sleeve coupled to the solid shaft, the bearing sleeve comprising:
   a first portion defining a first edge, a second edge, a first plurality of protrusions extending from an inner surface of the first portion, and at least one first bearing aperture; and
   a second portion defining a third edge, a fourth edge, and at least one second bearing aperture, the first portion configured to couple to the second portion about the solid shaft;
at least one first ball bearing disposed within the at least one first bearing aperture and retained between the first plurality of protrusions;
at least one second ball bearing disposed within the at least one second bearing aperture; and
at least one connector coupled between the first edge and the third edge, wherein the at least one connector is at least one hinge.

5. The assembly of claim 4, further comprising:
at least one clip member extending from the first portion second edge; and
at least one clip aperture formed in the second portion fourth edge, the at least one clip aperture configured to receive the at least one clip member to couple the first portion and the second portion.

6. The assembly of claim 5, further comprising:
at least one additional clip member extending from the fourth edge; and
at least one additional clip aperture formed in the second edge, the at least one additional clip aperture configured to receive the at least one additional clip member to couple the first portion and the second portion.

* * * * *